(12) United States Patent
Fang

(10) Patent No.: US 9,818,306 B2
(45) Date of Patent: Nov. 14, 2017

(54) SYSTEM AND METHOD FOR ASSESSING LEARNING OR TRAINING PROGRESS

(71) Applicant: AFFICIENT ACADEMY, INC., Saratoga, CA (US)

(72) Inventor: Jiayuan Fang, Saratoga, CA (US)

(73) Assignee: AFFICIENT ACADEMY, INC., San Jose, CA (US)

( * ) Notice: Subject to any disclaimer, the term of this patent is extended or adjusted under 35 U.S.C. 154(b) by 222 days.

(21) Appl. No.: 14/573,281

(22) Filed: Dec. 17, 2014

(65) Prior Publication Data

US 2016/0180725 A1 Jun. 23, 2016

(51) Int. Cl.
*G09B 3/00* (2006.01)
*G09B 7/00* (2006.01)

(52) U.S. Cl.
CPC .................................. *G09B 7/00* (2013.01)

(58) Field of Classification Search
USPC .......................................................... 434/322
See application file for complete search history.

*Primary Examiner* — Kesha Frisby

(57) ABSTRACT

A method for assessing a user's progress in learning a plurality of skills is disclosed. The method may include assigning a weighing factor to each of the plurality of skills. For each skill, the method may include providing a plurality of problems to the user, receiving answers to the plurality of problems from the user, and determining an accuracy rate associated with that skill based on the answers. The method may also include determining a probability of obtaining a score equal to or above a predetermined score by the user based on the weighting factors assigned to the plurality of skills and the accuracy rates associated with the plurality of skills.

21 Claims, 9 Drawing Sheets

SYSTEM AND METHOD FOR ASSESSING LEARNING OR TRAINING PROGRESS

TECHNICAL FIELD

This disclosure relates generally to learning or training applications on a computer. More specifically, it relates to learning or training applications capable of assessing the learning/training progress of a learner/trainee and identifying high impacting skills to improve learning/training efficiency.

BACKGROUND

Traditional knowledge learning and skill training programs rely on instructions and practice problems to help a user (e.g., a learner or a trainee) to improve his/her understanding of new concepts and skills in solving problems. Typically, a number of problems are provided to the user. The user finishes some or all the problems in a certain time period and submits the answers. The learning/training programs provide feedbacks to the user indicating how many problems are correctly answered and how many are not. The user may correct the problems which are answered incorrectly and/or practice more. In this traditional process, the user's learning/training progress is often linked to the percentage of problems that are correctly answered in a set of practice problems. This measure of learning/training progress, however, is difficult to provide an accurate assessment of the user on the proficiency levels of the skills to be learned, and is difficult to forecast the performance of the user in a comprehensive exam. In addition, traditional learning/training programs do not have the intelligence or ability to make dynamic adjustment of focusing areas to optimize the efficiency of the learning/training. The present disclosure is directed to overcoming or mitigating one or more of these problems as set forth above.

SUMMARY

In one aspect, the present disclosure is directed to a method for assessing a user's progress in learning a plurality of skills. The method may include assigning a weighing factor to each of the plurality of skills. For each skill, the method may include providing a plurality of problems to the user, receiving answers to the plurality of problems from the user, and determining an accuracy rate associated with that skill based on the answers. The method may also include determining a probability of obtaining a score equal to or above a predetermined score by the user based on the weighting factors assigned to the plurality of skills and the accuracy rates associated with the plurality of skills.

In another aspect, the present disclosure is directed to a computer system for assessing a user's progress in learning a plurality of skills. The computer system may include a processor device operatively coupled to a memory device. The processor device may be configured to execute instructions stored in the memory device to perform operations. The operations may include assigning a weighing factor to each of the plurality of skills. For each skill, the operations may include providing a plurality of problems to the user, receiving answers to the plurality of problems from the user, and determining an accuracy rate associated with that skill based on the answers. The operations may also include determining a probability of obtaining a score equal to or above a predetermined score by the user based on the weighting factors assigned to the plurality of skills and the accuracy rates associated with the plurality of skills.

In a further aspect, the present disclosure is directed to a non-transitory, computer-readable medium. The computer-readable medium may store instructions that, when executed by a processor device, cause the processor device to perform a method for assessing a user's progress in learning a plurality of skills. The method may include assigning a weighing factor to each of the plurality of skills. For each skill, the method may include providing a plurality of problems to the user, receiving answers to the plurality of problems from the user, and determining an accuracy rate associated with that skill based on the answers. The method may also include determining a probability of obtaining a score equal to or above a predetermined score by the user based on the weighting factors assigned to the plurality of skills and the accuracy rates associated with the plurality of skills Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

Embodiments consistent with the present disclosure involve knowledge/skill learning and/or training applications or computer programs that help a user (e.g., a learner or a trainee) to learn various knowledge subjects and/or practicing various skills. The phrases "knowledge learning," "skill learning," "skill training," and "skill practicing" may be used interchangeably to refer to a broad range of applications of the present disclosure, including learning knowledge subjects, practicing and training on skills, gaining experience, etc. For simplicity, the term "skills" is used herein to refer to the subjects (e.g., knowledge, skills, experience, etc.) being learned, practiced, trained, etc. Similarly, the term "learn" is used herein to refer to the action of training, acquiring knowledge, practicing skills, gaining experience, etc. A skill may include a unit of knowledge, concept, or material that to be learned by a user. For example, in mathematics, a skill may refer to a major area of math such as calculus, trigonometry, algebra, geometry, etc. In another example, a skill may refer to a tiny advance in concept or solution methodology, such as creating equations in two or more variables to represent relations between quantities, proving theorems about triangles, etc. Depending on the subject matter being learned, the difficulty level of the subject matter, and the user's ability to learn, a skill may include different degrees of increments to advance the learning process.

As used herein, a user using the disclosed skill learning applications to learn one or more skills may also be referred to as a learner, a trainee, or a student. It is noted that such references do not necessarily link to the real world status associated with the learner/trainee/student. For example, a school teacher using the disclosed skill learning applications may be referred to as a learner, trainee, or student, in the sense that the school teacher is learning new skills while using the disclosed skill learning applications.

Aspects of the present disclosure may be implemented using a computer or a computer system. For example, a skill learning application may be in the form of a software application installed on a computer. In another example, a skill learning application may be in the form of a web service provided by a web server and executed using a general computer program, such as a browser. In a further example, a skill learning application may be in the form of a mobile application (also referred to as a mobile app), which is downloaded from an online app store and executable on a mobile device such as a smart phone, a tablet, etc.

Figure 1A:
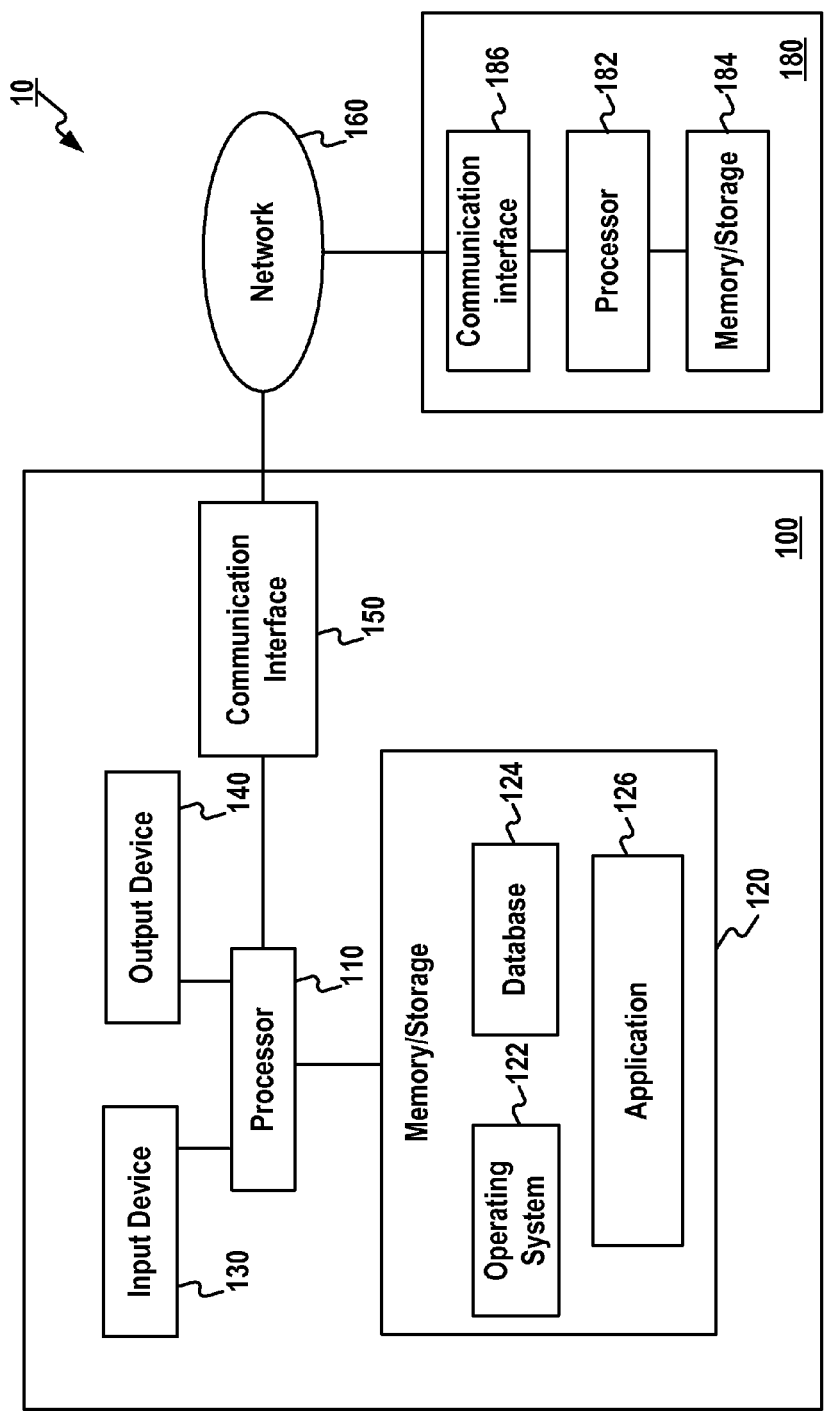
FIG. 1A is a block diagram of an exemplary computer system for implementing one or more aspects of the present disclosure.

FIG. 1A is a block diagram of an exemplary computer system 10 for implementing one or more aspects of the present disclosure. System 10 may include a computer 100, a network 160, and a server 180. Computer 100 may be a desktop computer, a laptop computer, netbook computer, a smart phone, a tablet, a personal digital assistant (PDA), a mobile reading device such as an e-book reader, or other types of computers. Computer 100 may include a processor 110, a memory/storage module 120, an input device 130, an output device 140, and a communication interface 150. Processor 110 may be a central processing unit (CPU) or a mobile processor. Depending on the type of hardware being used, processor 110 can include one or more integrated circuits (ICs), printed circuit boards (PCBs), and/or microprocessor chips. Processor 110 can execute computer program instructions to perform various methods, operations, and/or tasks that will be explained in greater detail below.

Memory/storage module 120 may include, for example, a random-access memory (RAM), a read-only memory (ROM), a flash memory, a solid-state drive (SSD), a hard drive, an optical drive, or other suitable temporary or permanent data storing devices. In some embodiments, computer program instructions can be stored, accessed, and read from the ROM, flash memory, SSD, hard drive, optical drive, or any other suitable memory location, and loaded into the RAM for execution by processor 110. For example, memory/storage module 120 may store an operating system 122, one or more software applications 126, and a database 124.

In some embodiments, the disclosed skill learning application may be implemented in the form of software application 126. Software application 126 or portions of it may be stored on a computer readable medium, such as a hard drive, an optical disk, a flash drive, an SD card, a memory stick, or any other suitable medium, and can be read and acted upon by processor 110 using routines that have been loaded to memory/storage module 120.

In some embodiments, input device 130 and output device 140 may be coupled to processor 110 through appropriate interfacing circuitry. In some embodiments, input device 130 may include a hardware keyboard, a mouse, a keypad, a touch screen, etc., through which a user may input information to computer 100. Input device 130 may also include a camera, a microphone, one or more hardware buttons, etc. Output device 140 may include one or more display devices such as computer monitors, televisions, projectors, LCDs, LEDs, etc. Output device 140 may also include a printer device, a speaker, etc.

Communication interface 150 may provide communication connections such that computer 100 may exchange data with external devices. For example, computer 100 may be connected to network 160 through communication interface 150. Communication interface 150 may include a network adaptor, a wireless module, a telecommunication module, a Bluetooth device, etc.

Network 160 may include telecommunication networks such as 2G, 3G, 4G, and LTE networks; wireless networks such as WLAN/WiFi and Bluetooth networks; cable or optical fiber networks; the Internet; or other suitable networks capable of communicatively connecting computer 100 to server 180.

Server 180 may include one or more computer systems configured to receive requests from computer 100 and respond to the requests. Server 180 may connect to network 160 through a communication interface 186. It is noted that although only one server and one communication interface is shown in FIG. 1A, a person of ordinary skill in the art would understand that server 180 may include multiple apparatuses, computer systems, or infrastructure components that are physically located in a centralized or distributed manner, and communication interface 186 may include different types of connection technologies commensurate with the apparatuses, computer systems, or infrastructure components connected thereto.

Server 180 may include one or more processors, such as processor 182. Processor 182 may include one or more CPUs, ICs, PCBs, or other computing devices. Processor 182 can execute computer program instructions to perform various operations and/or tasks.

Server 180 may include one or more data storing devices, such as memory/storage module 184. Memory/storage module 184 may include one or more RAMs, ROMs, SSDs, hard drives, high volume storage devices, or other suitable temporary or permanent data storing devices.

Figure 1B:
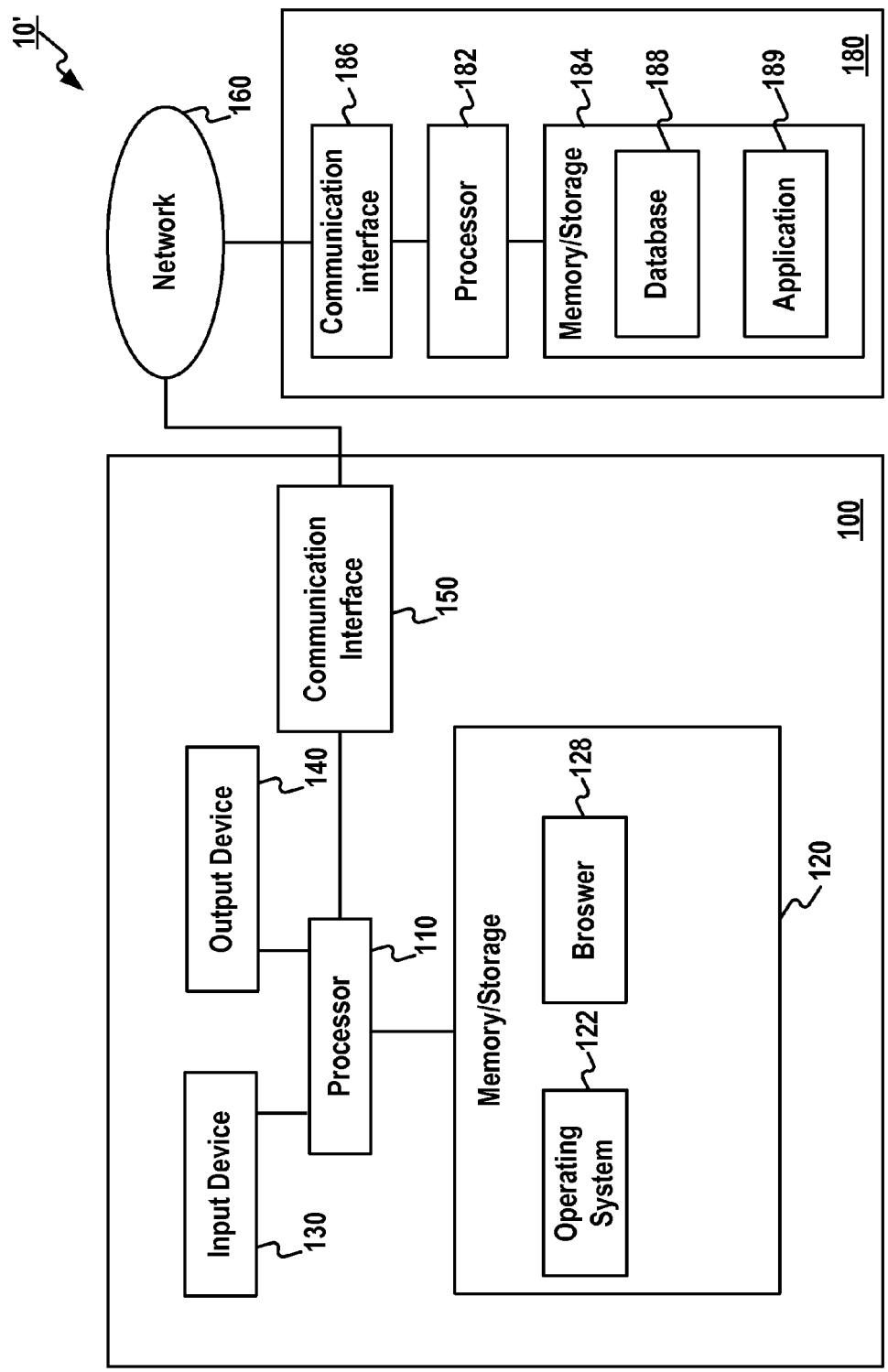
FIG. 1B is a block diagram of another exemplary computer system for implementing one or more aspects of the present disclosure.

FIG. 1B is a block diagram of another exemplary computer system 10' for implementing one or more aspects of the present disclosure. In system 10' shown in FIG. 1B, the disclosed skill learning application may be implemented as a web service provided by server 180. For example, server 180 may include a web or server application 189 and a database 188 to provide the web service. A user may use the skill learning application by accessing the web service from computer 100. For example, computer 100 may include a browser application 128. Browser application 128 may be a general Internet browser application. System 10' shifts all or a majority of computational-heavy tasks from computer 100 to server 180, which may improve the executing performance of the skill learning application.

In some embodiments, computer 100 may execute a skill learning application (or using browser 128 to access a skill learning web service) to help a user to learn one or more skills. For example, in one embodiment, the skill learning application may be a computerized program in mathematics that helps a student to learn middle level (Grade 4-Grade 8) or high level (Grade 9-Grade 12) mathematics. In another embodiment, the skill learning application may be a self-learning program to help a user to learn a foreign language. In a further example, the skill learning application may be a standardized test preparing aid to help a user to prepare for a standardized test or exam, such as SAT, GRE, GMAT, LSAT, etc. In the following disclosure, the skill learning application will be described in the context of a math learning program. But the principle of the disclosed system and method also applies to other subject matter.

One purpose of the skill learning application is to help the user to learn a plurality of skills involved in the subject matter of the application. For example, a math learning application for school students may use the official standard (US Common Core State Standards in Mathematics) on the required skills for each grade level as a guideline. For example, each grade level may include a plurality of skills. There may be certain logical relations among skills such that certain skills need to be learned before other skills. Each skill may be an incremental advance in concept or solution methodology that can be illustrated and learned by one or more short examples. For example, skills about the concept Circles may include (1) knowing the relations between different properties of a circle, (2) identify and describe relations among inscribed angles, radii, and chords, (3) construct the inscribed and circumscribed circles of a triangle, and prove properties of angles for a quadrilateral inscribed in a circle, etc.

Figure 2:
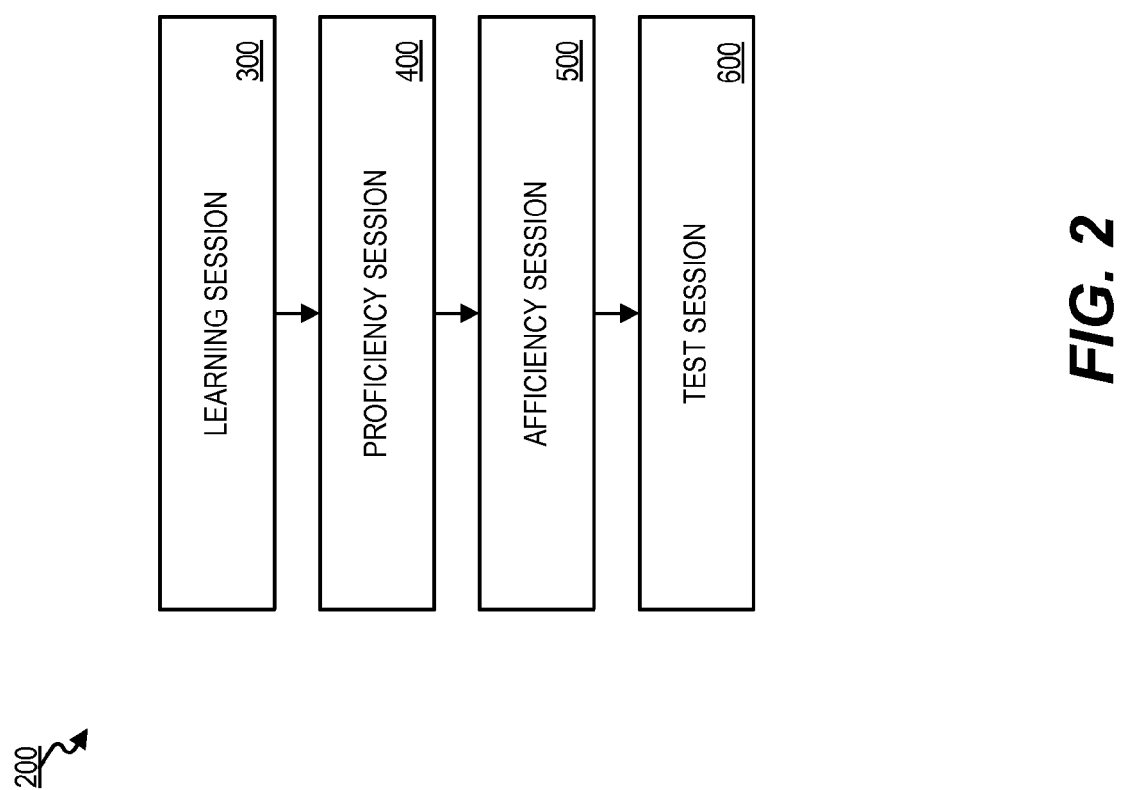
FIG. 2 is a flow chart of an exemplary computerized learning/training process, according to some embodiments of the present disclosure.

In some embodiments, the disclosed skill learning application may help the user to learn one or more skills through a series of sessions. FIG. 2 shows a flow chart of an exemplary learning process 200 including four sessions. Referring to FIG. 2, learning process 200 includes a learning session 300, a proficiency session 400, an Afficiency™ session 500, and a test session 600. While the user is encouraged to follow each session step-by-step, the user is allowed to skip one or more sessions before taking a test in test session 600 to test his/her learning result. During the learning process, system 10/10' may provide assessment of the user's learning progress. The assessment may be fed back to the user in real time. In addition, system 10/10' may dynamically adjust the operations of one or more sessions depending on the user's learning progress. In some embodiments, the dynamic adjustment may be aimed to improve the learning efficiency, such as maximizing the chance of obtaining a high score in a real test (e.g., midterm exam, final exam, standardized test, etc.).

Figure 3:
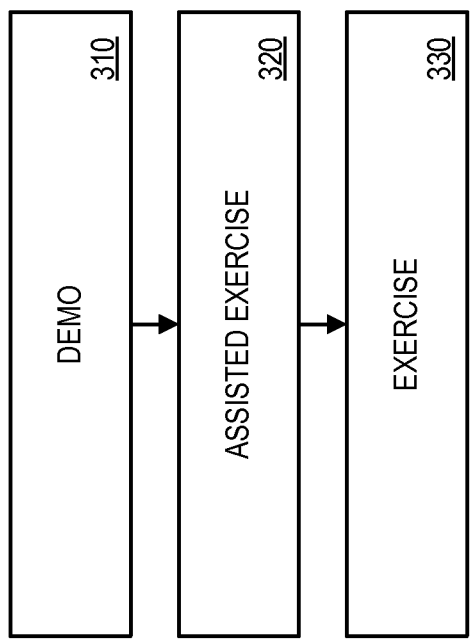
FIG. 3 is a flow chart of an exemplary method for implementing a learning session, according to some embodiments of the present disclosure.

FIG. 3 is a flow chart of an exemplary method for implementing learning session 300, according to some embodiments of the present disclosure. In some embodiment, the disclosed skill learning application may include a plurality of learning sessions, each associated with a skill. Each skill may be labeled by a learning status or learning progress mark. For example, before the user takes a learning session, the skill associated with the learning session may be labeled as To Be Learned. As the user goes through the learning session, the status mark may be changed.

Referring to FIG. 3, learning session 300 may include a demo sub-session 310, an assisted exercise sub-session 320, and an exercise sub-session 330. In demo sub-session 310, explanation of one or more new concepts associated with the skill and the way to solve one or more example problems may be provided. Certain interactive features may be provided, such as buttons, scroll bars, etc., such that the user may control the progress of demo sub-session 310, or browse or skip the content in demo sub-session 310.

In assisted exercise sub-session 320, procedures of solving one or more example problems may be provided and the example problem(s) may be partially solved. The user may be asked to complete the solution. After entering the solution, the user may submit the solution and the learning application may respond whether the solution is correct. If the solution is incorrect, the user may be asked to re-enter the solution. In assisted exercise sub-session 320, the user may be allowed to request for hints for solving the example problems. If there are more than one hints, the hints may be displayed to the user sequentially or once at a time upon receiving a user input, such as a click of a button or a press of a key. Again, the user may follow the flow of example problems in assisted exercise sub-session 320 or skip this sub-session.

In exercise sub-session 330, a plurality of practicing problems may be provided. The user may be asked to solve the practicing problems one after another. For example, the user may enter the answer to a practicing problem and submit the answer by clicking a button or pressing a key. System 10/10' may receive the answer from the user. Once the answer to a practicing problem is received, whether the answer is correct or not may be fed back to the user right away. If the answer is incorrect, the user may be allowed to re-enter the answer but the practicing problem may not be counted as correctly answered. In some embodiments, the user may be required to provide the correct answer to a practicing problem in order to move to the next practicing problem. In some embodiments, during the solution of a practicing problem, the user may be allowed to ask for hints to solve the practicing problem. Once a request for hints is received, system 10/10' may provide one or more hints for completing the solution of the practicing problem. In some embodiments, once a hint is provided, the corresponding practicing problem may not be regarded as correctly answered. The user may be required to have a specified number (e.g., 3, 5, 10, etc.) of correct answers in a row to pass exercise sub-session 330. Once the user passes exercise sub-session 330, the associated skill may then be promoted to Level 1 from To Be Learned. If the associated skill is labeled other than To Be Learned, then the label may remain the same.

Through learning session 300, a user may be able to understand the concept of a skill and may be able to solve problems associated with that skill. If the user exits learning session 300 before completing the whole session, the learning status of the user may be saved. When the user starts learning session 300 next time, the session may be resumed from where it is left.

Once the user completes learning session 300 for one or more or all skills, the user may start proficiency session 400. In proficiency session 400, system 10/10' may provide a problem set to the user relevant to one or more skills. For example, system 10/10' may provide a problem set including problems associated with different skills. By completing a problem set, the user's learning progress of a skill included in the problem set may be advanced from Level 1 to Proficient. Each problem set may contain one or more problems, such as one, five, eight, ten, or other numbers of problems automatically selected by system 10/10'. For example, in one embodiment, the majority of problems in a problem set may be selected from the skills to be Proficient in the same grade level. A small number of problems in the problem set may be selected from the skills that are already Proficient in the same or a lower grade level.

Figure 4:
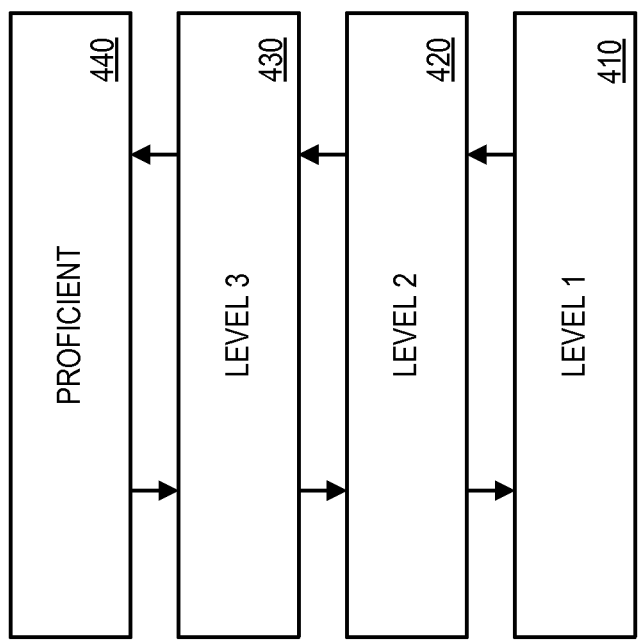
FIG. 4 is a block diagram of exemplary skill levels in a proficiency session, according to some embodiments of the present disclosure.

In proficiency session 400, a plurality of progress marks may be used to indicate the skill level of the user. FIG. 4 is a block diagram of exemplary skill levels in proficiency session 400, according to some embodiments of the present disclosure. In FIG. 4, four skill levels are provided: Level 1 (410), Level 2 (420), Level 3 (430), and Proficient (440). It is noted that these skill levels are illustrative. Other numbers of skill levels with different markings may also be used. In some embodiments, each correctly answered problem may move the skill level of the associated skill from Level 1 to Level 2, or from Level 2 to Level 3. Similarly, each incorrectly answered problem may move the skill level of the associated skill from Level 1 to To Be Learned (not shown), from Level 2 to Level 1, from Level 3 to Level 2, or from Proficient to Level 3. In some embodiments, for certain skill levels, if a new problem is correctly solved within a certain specified time limit, the skill level may be advanced. On the other hand, if the new problem is correctly solved but the time duration of solving the new problem exceeds the specified time limit, the skill level may remain at the same level.

In some embodiments, a problem set in proficiency session 400 may be selected based on skill levels. For example, a problem set may contain about two thirds of problems selected from problems associated with skills demoted to Level 1, Level 2, or Level 3 in prior practices and/or problems associated with skills having progress marks of Level 1, Level 2, and Level 3 for more than a predetermined time period (e.g., 10 hours, 16 hours, 1 day, etc.). The problem set may also contain about one sixth of problems selected from problems associated with Proficient skills of the same grade level. In addition, the problem set may contain about one sixth of problems selected from problems associated with Proficient skills of lower grade levels. The above problem selection scheme is for illustrative purpose only. Other problem selection methods may also be used.

In some embodiments, when a problem set in proficiency session 400 contains problems associated with a skill of a lower grade level, the user's answers to those problems may also affect the skill level of that lower grade level skill. For example, if the user answers incorrectly a predetermined number of problems (e.g., three problems) associated with that lower grade level skill in a row, or if the accuracy rate (e.g., calculated based on a plurality of latest problems, such as 10 latest problems associated with that lower grade level skill) is less than a threshold, such as 0.5, then the progress mark of that lower grade level skill may be demoted from Proficient to Level 3. The user may be disqualified for the Afficiency™ session (to be discussed in greater detail below) of that lower grade level. The user may be asked to restart the proficiency session of that lower grade level to get proficient of that lower grade level skill.

Once all or most of the skills in a grade level become Proficient, system 10/10' may provide the user with Afficiency™ session 500. One objective of Afficiency™ session 500 is to increase or maximize the chance of obtaining an "A" (or excellent) grade in a real test by raising the accuracy rate and speed of solving problems.

Figure 5:
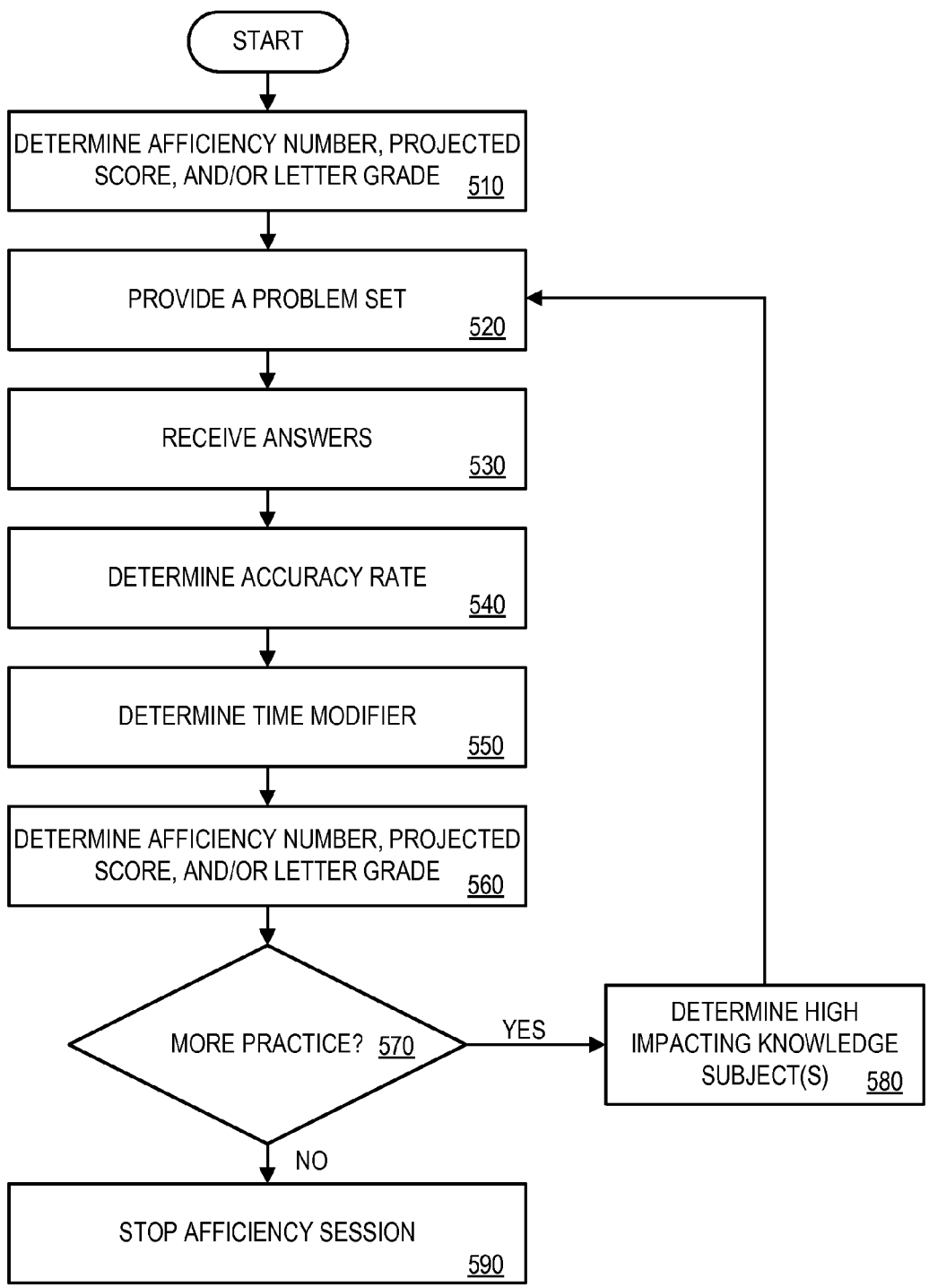
FIG. 5 is a flow chart of an exemplary method for implementing an Afficiency™ session, according to some embodiments of the present disclosure.

FIG. 5 is a flow chart of an exemplary method for implementing Afficiency™ session 500, according to some embodiments of the present disclosure. Afficiency™ session 500 starts from step 510, in which system 10/10' determines an Afficiency™ number, a projected exam score, and/or a projected letter grade. As used herein, an Afficiency™ number represents the probability (e.g., in percentage number) of receiving grade A in a real test (e.g., a final exam, a standardized test, etc.). The projected exam score may be a numerical score (e.g., a numerical score in a 100-point score system) that the user is likely to get in a real test. The projected letter grade may be a letter grade (e.g., A, B, C, D, etc.) that the user is likely to get in a real test. In step 510, an initial Afficiency™ number, an initial projected exam score, and/or an initial projected letter grade may be calculated based on the accuracy rate and/or the speed of solving problems in proficiency session 400. Exemplary methods of calculating the initial Afficiency™ number, the initial projected exam score, and the initial projected letter grade will be described in greater detail below in connection with step 560.

In step 520, system 10/10' may provide one or more problem sets, each including a plurality of problems, to the user. In some embodiments, the problems may be selected from the same grade level. Each problem set may be expected to be completed by the user within a certain amount of time (e.g., 10, 15, or 20 minutes, etc.). The user may be allowed to take a break and then resume working on a problem set.

In some embodiments, a problem set may contain several skills. In some embodiments, a problem set may cover all or most of the required skills in a grade level. In a problem set, each problem may be associated with a skill. Assuming there are N skills subject to test in a grade level, system 10/10' may assign a weighing factor W(i) to each (e.g., the ith) of such skills. The summation of all weighting factors (e.g., normalized if necessary) may be equal to one. Accordingly, the weighting factor W(i) may represent the fractional contribution of the ith skill towards a grade level. The weighting factors may be pre-determined by system 10/10'.

In step 530, system 10 may receive answers to the plurality of problems from the user. For example, system 10 may receive answers through input device 130.

In step 540, system 10 may determine an accuracy rate associated with a skill based on the answers received from the user. For example, for the ith skill, the associated accuracy rate $A(i)$ may be determined as follows. Assume that M problems have been answered for the ith skill. Each of the M problems may be assigned an index of 1, 2, ..., M, with a smaller index corresponding to a problem answered earlier. Assume that among the M problems, L problems are answered correctly, with corresponding index $j_1, j_2, \ldots, j_L$. Then the accuracy rate $A(i)$ can be computed as $A(i)=(j_1+j_2+ \ldots +j_L)/(1+2+ \ldots +M)$. Using this method, larger weights are given progressively to more recently answered problems. For example, assume M=4 and only the first two problems are correctly answered, then the accuracy rate A(i) may be calculated as (1+2)/(1+2+3+4)=0.3. In another example, assume M=4 and only the last two problems are correctly answered, then the accuracy rate A(i) may be calculated as (3+4)/(1+2+3+4)=0.7, much higher than the prior example because more recently answered problems are given higher weights in determining the accuracy rate.

While the progressive weightings in the above exemplary method is incremented as a series of natural numbers (e.g., 1, 2, . . . , M), one skilled in the art should appreciate that any suitable way of assigning larger weights to more recently answered problems may be used. The total number of problems used to calculate A(i) (i.e., M) may be selected to suit for the particular skill (i.e., ith skill). For example, if in a problem set, the number of problems associated with a particular skill is small, then M may be selected to be a relatively small number. On the other hand, if the number of problems associated with a particular skill is larger, then M may be selected to be a relatively large number. In some embodiments, M may be equal to or smaller than 10. It is noted that the numbers of problems and the algorithm used in determining accuracy rate A(i) described above are for illustration purpose only. Other numbers and methods may also be used to determine the accuracy rate.

In step 550, system 10/10' may determine a time modifier relating to the time duration spent by the user to answer to the problems. In one embodiment, the time modifier may be determined based on a mean time duration T(i) spent by the user to answer one or more problems associated with the ith skill. For example, for the ith skill, the mean time duration T(i) may be determined as follows. Assume that M problems have been answered for the ith skill. Among the M problems, K problems are answered correctly. Each of the K correctly answered problems may be assigned an index of 1, 2, . . . , K, with a smaller index corresponding to a problem answered earlier. Assume that $T_1, T_2, \ldots, T_K$ are the time durations spent by the user to solve (correctly) the problems of index 1, 2, . . . , K, respectively. Then the mean time duration T(i) can be computed as $T(i)=(1*T_1+2*T_2+\ldots+K*T_K)/(1+2+\ldots+K)$. Using this method, larger weights are given progressively to more recently answered problems. Again, one skilled in the art should appreciate that other methods may also be used to determine T(i). Similar to the calculation of A(i), the number of problems that have been answered (i.e., M, including correctly and incorrectly answered problems) may be selected based on the skill. In some embodiments, M may be equal to or smaller than 10.

In some embodiments, a ratio between the actual time duration (e.g., mean time duration) spent by the user to answer one or more problem associated with a skill (e.g., T(i)) and a specified time associated with that skill may be determined. For example, for each skill, system 10/10' may set a specified time (ST) for the completion of a problem of that skill. For the ith skill, a ratio R(i) between the actual time (e.g., T(i)) and the specified time ST(i) may be determined. For example, R(i) may be determined as R(i)=T(i)/ST(i). R(i) may indicate how fast the user correctly answer a problem associated with the ith skill compared to the specified time (e.g., a benchmark time) set for that ith skill. In some embodiments, the ratio R(i) may be used as the time modifier.

Once the time modifier is determined, system 10/10' may adjust the accuracy rate A(i) based on the time modifier. For example, in case the ratio R(i) is used as the time modifier, a penalty may be imposed on accuracy rate A(i) associated with the ith skill if R(i) is larger than 1. The adjusted accuracy rate AC(i) may be determined as AC(i)=A(i)/R(i) if R(i)>1. Otherwise, AC(i)=A(i).

In step 560, system 10/10' may determine an Afficiency™ number, a projected test score, and/or a projected letter grade based on weighting factors W(i) assigned to the skills and accuracy rates A(i) (or adjusted accuracy rates AC(i)) associated with the skills. In case that the Afficiency™ number, projected test score, and/or letter grade have already been determined previously (e.g., in step 510), system 10/10' may update the results.

In one embodiment, the Afficiency™ number, projected test score, and projected letter grade may be determined as follows. Assume a grade level includes N skills subject to test and a real test covers all N skills through U problems (N≤U, as multiple problems may be associated with the same skill). In the real test, the user would be given all U problems and the final score can be determined based on how many problems are answered correctly. As described above, the weight of each correctly answered problem may differ because the ith skill to which a first correctly answered problem is associated may have a weighting factor W(i) that is different from the weighting factor W(j) of the jth skill to which a second correctly answered problem is associated. For simplicity, the following description will assume N=U. That is, the number of skills is equal to the number of problems and each skill corresponds to a single problem and vice versa. In cases that multiple problems are associated with a single skill, each problem may be treated as corresponding to a separate, single skill with the corresponding weighting factor W(i) divided among the multiple problems. For example, if a weighting factor W(i) is assigned to the ith skill and three problems are associated with the ith skill, then each of the three problems may be treated as being associated with a separate skill (e.g., the first problem may be treated as being associated with the ith skill, the second problem may be treated as being associated with a hypothetical (N+1)th skill, and the third problem may be treated as being associated with a hypothetical (N+2)th skill). If all skills having multiple problems associated thereto are treated likewise, the summation of all hypothetical skills can bring the number of skills up to U such that N+all hypothetical skills=U. In doing so, each of the multiple problems that are originally associated with a single skill may be assigned a weighting factor that is a fraction of W(i). For example, in the three-problem example above, a new weighting factor (e.g., 0.5*W(i)) may be assigned to the first problem (and thus the corresponding ith skill). Similarly, new weighting factors (e.g., 0.3*W(i) and 0.2*W(i)) may be assigned to the second problem (and thus the corresponding hypothetical (N+1)th skill) and third problem (and thus the corresponding hypothetical (N+2)th skill), respectively. It is noted that W(i) may be divided evenly (e.g., ⅓ to each problem in the above three-problem case) or unevenly. With the above treatment, a problem and a skill (or hypothetical skill) can be mapped to each other on a one-to-one basis (e.g., N=U as noted above). Therefore, in the following description, a problem and a skill may be addressed interchangeably.

In some embodiments, a problem set may contain N skills. In some cases, the N skills covered in the problem set may correspond to all skills in a grade level such that the problem set can simulate a real test. Assume each skill can have two outcomes (e.g., answered correctly or incorrectly), then the number of all possible combinations of outcomes from the problem set is $2^N$. If more than two outcomes are possible (e.g., an answer may be partially correct), then the number of all possible combinations of outcomes can be similarly calculated as $O_1 \times O_2 \times \ldots \times O_N$, where $O_i$ is the number of possible outcomes for the ith skill. For simplicity, the following description assumes that only two outcomes (correct or incorrect) are possible for each skill but the methods described herein are also applicable for situations in which other numbers of outcomes are used.

One exemplary method can be described in connection with a three-skill example. Assume that a problem set contains three skills X, Y, and Z, and each skill has two possible outcomes: correct or incorrect. If a correctly answered skill is denoted by 1 and an incorrectly answered skill is denoted by 0, then there are eight different combinations of outcomes for (X, Y, Z): (0, 0, 0), (0, 0, 1), (0, 1, 0), (0, 1, 1), (1, 0, 0), (1, 0, 1), (1, 1, 0), and (1, 1, 1), Assume that the weighting factors assigned to skills X, Y, Z are W(X)=0.5, W(Y)=0.3, and W(Z)=0.2, and the full test score is 100 points, then there are seven possible scores that can be obtained from this problem set, as shown in Table 1.

TABLE 1

| Outcomes (X, Y, Z) | Score W(X) = 0.5, W(Y) = 0.3, W(Z) = 0.2 | Outcome Probability A(X) = 0.9, A(Y) = 0.7, A(Z) = 0.5 | Outcome Probability (%) |
|---|---|---|---|
| (0, 0, 0) | 0 | (1 − 0.9) × (1 − 0.7) × (1 − 0.5) | 1.5% |
| (0, 0, 1) | 20 | (1 − 0.9) × (1 − 0.7) × 0.5 | 1.5% |
| (0, 1, 0) | 30 | (1 − 0.9) × 0.7 × (1 − 0.5) | 3.5% |
| (0, 1, 1) | 50 | (1 − 0. 9) × 0.7 × 0.5 | 3.5% |
| (1, 0, 0) | 50 | 0.9 × (1 − 0.7) × (1 − 0.5) | 13.5% |
| (1, 0, 1) | 70 | 0.9 × (1 − 0.7) × 0.5 | 13.5% |
| (1, 1, 0) | 80 | 0.9 × 0.7 × (1 − 0.5) | 31.5% |
| (1, 1, 1) | 100 | 0.9 × 0.7 × 0.5 | 31.5% |

As shown in Table 1, although there are eight possible outcome combinations, there are only seven possible scores because both (0, 1, 1) and (1, 0, 0) yield the same score. If the weighting factors assigned to the skills are changed, then the possible scores may also change.

As described above, for each skill, an accuracy rate A(i) or an adjusted accuracy rate AC(i) can be determined (e.g., in step 540 or 550). For simplicity, in the following description accuracy rate A(i) will be used as a general term to include both A(i) and AC(i) (note that AC(i) takes into account the speed of solving a problem). Accuracy rate A(i) may indicate the probability that the user can correctly answer a problem/skill in a real test. On the other hand, (1−A(i)) may indicate the probability that the user would incorrectly answer a problem/skill. Because accuracy rate A(i) corresponding to each skill can be determined through practice in proficiency session 400 and/or Afficiency™ session 500, accuracy rate A(i) may be used to predict or project the likelihood of each outcome combination. For example, assume that the user's accuracy rates associated with skills X, Y, and Z are A(X)=0.9, A(Y)=0.7, and A(Z)=0.5, respectively, as shown in Table 1, then the probability that the user incorrectly answers all three problems/skills can be estimated as (1−A(X))*(1−A(Y))*(1−A(Z))= (1−0.9)×(1−0.7)×(1−0.5)=0.015=1.5%. Similarly, the probability that the user correctly answers all three problems/skills can be estimated as A(X)*A(Y)*A(Z)= 0.9*0.7*0.5=0.315=31.5%. All eight probabilities for the eight outcome combinations are listed in Table 1.

As noted above, out of the eight outcome combinations, there are only seven possible scores. Based on the outcome probabilities calculated for each outcome combination, the probabilities for all possible scores can be determined. For example, in the above example shown in Table 1, the probability of obtaining a score of 50 is the summation of probabilities associated with outcomes (0, 1, 1) and (1, 0, 0), which is 3.5%+13.5%=17%. The distribution of the probabilities against the scores is shown in FIG. 7.

Figure 7:
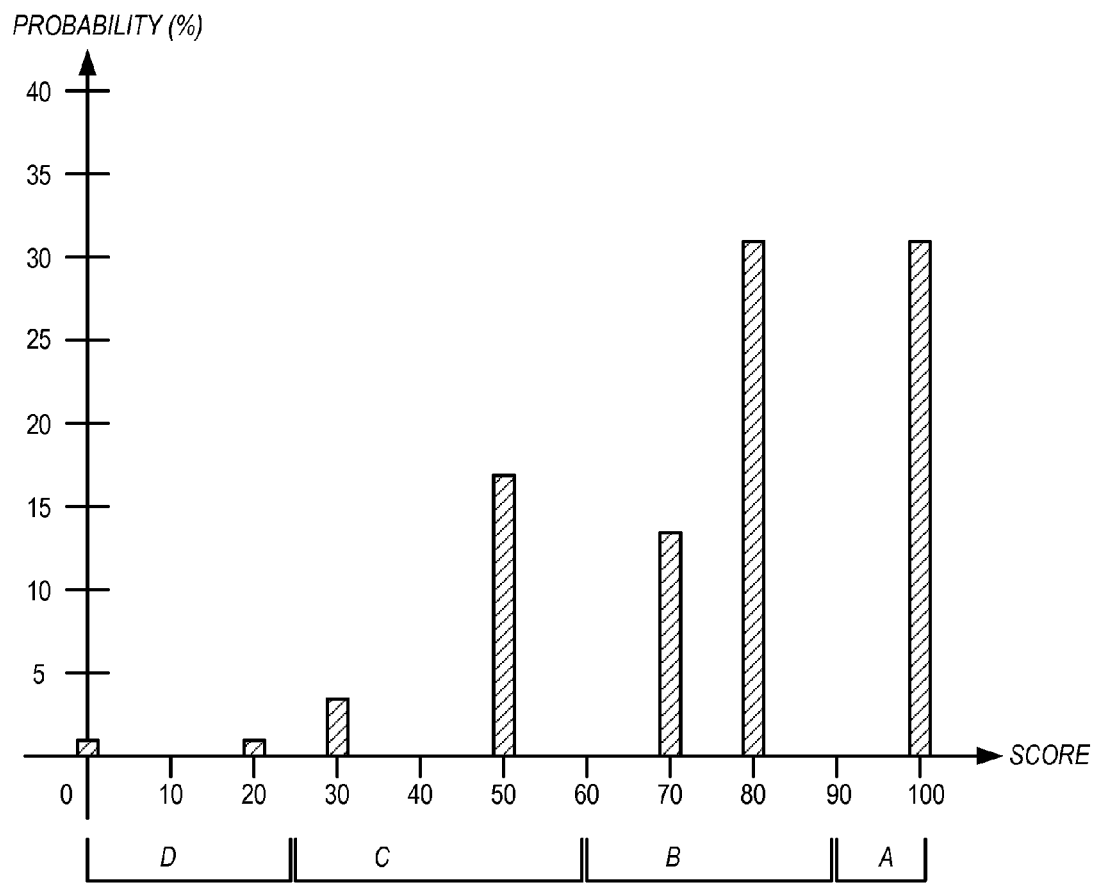
FIG. 7 shows an exemplary probability distribution, according to some embodiments of the present disclosure.

Referring to FIG. 7, the horizontal axis is the score and the vertical axis is the probability. The shadowed stems indicate the probabilities of obtaining a particular score. The probability values shown in FIG. 7 are the same as the percentage probabilities shown in Table 1, except that the probability of obtaining the score of 50 is the summation of the probabilities associated with outcomes (0, 1, 1) and (1, 0, 0), as noted above. Based on the probability distribution shown in FIG. 7, a probability of obtaining a specified score or above can be determined. For example, using the data of FIG. 7, the probability of obtaining the score of 80 or above may be calculated as the summation of all probabilities associated with the score of 80 or above, which is 31.5%+31.5%=63%. In another example, the probability of obtaining a score of 50 or above can be calculated as 17%+13.5%+31.5%+31.5%=93.5%.

Based on certain historical data, normalization curves, or other criteria, the numerical score system may be converted into a letter score or letter grade system. For example, referring to FIG. 7, the full 100 points may be divided into a plurality of zones. A score falls within a particular zone may correspond to a letter grade. In the example shown in FIG. 7, zone "A" is from 90 to 100, zone "B" is from 60 to 89, zone "C" is from 25 to 59, and zone "D" is from 0 to 24. Using the zone data, the Afficiency™ number, which represents the probability of obtaining a letter grade "A" in the test, may be calculated as the probability of obtaining a score of 90 or above. From the data shown in FIG. 7, the Afficiency™ number is 31.5% or simply 31.5. Alternatively or additionally, system 10/10' may determine the probability of obtaining each individual letter grade, each particular letter grade or above, each individual numerical score, and/or each particular numerical score or above.

Figure 8:
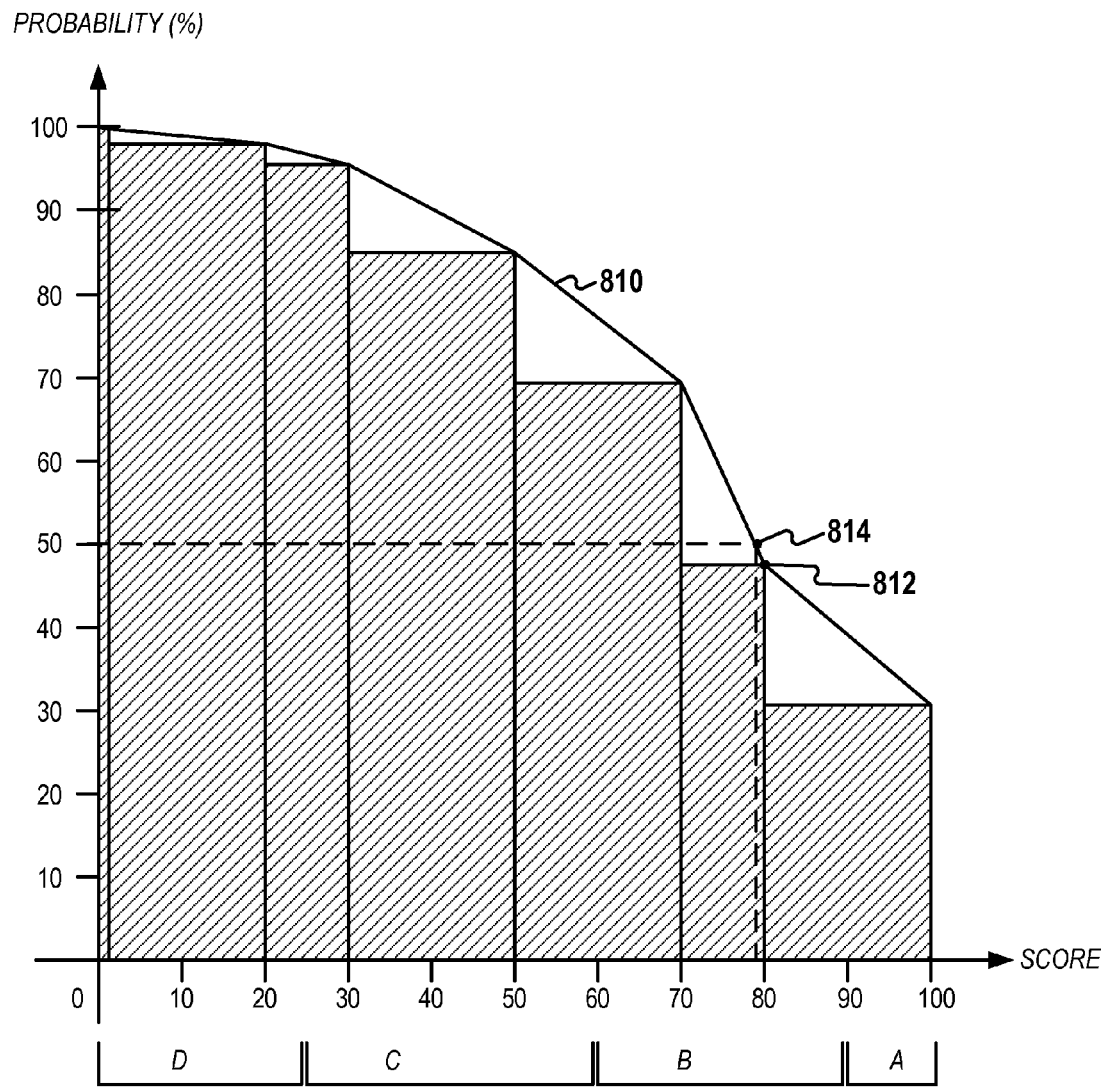
FIG. 8 shows an exemplary probability curve based on the probability distribution of FIG. 7, according to some embodiments of the present disclosure.

From the probability distribution shown in FIG. 7, system 10/10' can also determine a projected test score. The projected test score may be a numerical score or a letter grade, as the two types of score/grade can be connected through the zoning method described above. For example, system 10/10' may determine the projected score as the score at which the probabilities of obtaining a better score or a worse score are substantially the same. In other words, the probability of obtaining the projected score or above is about 50%. FIG. 8 shows the probability of obtaining a score or above as a function of the score, based on the individual probabilities shown in FIG. 7. Referring to FIG. 8, the probability of obtaining a score of 100 or above is, according to FIG. 7 and Table 1, 31.5%. The next possible score is 80. The probability of obtaining a score of 80, according to FIG. 7 and Table 1, is 31.5%. In some embodiments, assuming the probability distribution has a continuous spectrum, the probability of obtaining a score just above 80 can be regarded as being equal to the probability of obtaining a score just below 80. In other words, it can be assumed that it is equally likely to obtain a score just above and just below 80. Accordingly, the probability of obtaining a score of 80 or above can be calculated as the summation of the probability of obtaining the score of 100 and the probability of obtaining the score of 80 and just above, which can be calculated as 31.5%+31.5%/2=47.25%. Similarly, the probability of obtaining a score of 70, according to FIG. 7 and Table 1, is 13.5%. The probability of obtaining a score of 70 or above is the summation of the probability of obtaining the score of 100, the probability of obtaining the score of 80, and the probability of obtaining the score of 70 or just above, which is 31.5%+ 31.5%+13.5%/2=69.75%. In a similar manner, the probabilities of obtaining other scores or above can be determined. Other methods using a non-continuous spectrum and/or non-equal probabilities at a specific score may also be used.

Based on the probabilities shown in FIG. 8, a projected test score may be determined. For example, the projected test score may be determined as the score corresponding to the 50% probability value in FIG. 8. That is, the projected test score may be a score that the probability of obtain that score and above is 50%. Various methods may be used to determine the score corresponding to the 50% probability. For example, the score may be the closest possible score value to the 50% probability. In this case that score is 80, as indicated by point 812. In another example, a line fitting method may be used to approximate the probability curve that is close to the discrete probability values in FIG. 8. For instance, curve 810 is such an approximation, which is formed by connecting the tips of the stems. Point 814 on curve 810 corresponds to the 50% probability, and the corresponding score of point 814 is about 79. Once the projected numerical test score is determined, the projected letter grade may be determined according to the letter grade zones as described above. For example, both scores corresponding to points 812 and 814 fall within the zone of letter grade "B". Other methods may also be used to determine the projected test score, including the numerical score and the letter grade.

In some embodiments, the projected test score may be calculated based on the accuracy rate A(i) or adjusted accuracy rate AC(i) and the weight w(i) as follows: projected test score=$100*(A(1)*W(1)+A(2)*W(2)+ \ldots + A(N)*W(N))$. For the exemplary case shown in Table 1, the projected test score=$100*(A(1)*W(1)+A(2)*W(2)+A(3)*W(3))=100*(0.9*0.5+0.7*0.3+0.5*0.2)=76$. The projected letter grade may be similarly determined based on the projected test score using the method described above.

In some embodiments, the Afficiency™ number, projected test score, and projected letter grade may be determined using an animated test method. For example, to obtain or estimate the probability distribution shown in FIG. 7, system 10/10' may perform a large number of animated tests (e.g., 10,000 animated tests). Each animated test may include the same set of skills as those included in the problem set provided to the user. In each animated test, the outcome of each skill (e.g., correct or incorrect) may be obtained randomly based on the accuracy rate A(i) or the adjusted accuracy rate AC(i). That is, the chance of obtaining a correct answer of a skill is programmed to be the same as the accuracy rate A(i) or the adjusted accuracy rate AC(i) corresponding to that skill.

Based on the combination of outcomes (correct/incorrect skills) and the weighting factors assigned to the skills, each animated test may generate an animated score. With the large number of animated tests, the collection of animated scores may assemble a distribution over the full range of scores. The probability of obtaining a particular range of score may be determined as the number of animated tests yielding that particular range of score over the total number of animated tests. For example, if out of 10,000 animated test, there are 325 animated tests generating an animated score of 80 to 81, then the probability of obtaining the score of 80 to 81 can be estimated to be 325/10000=3.25%. After the probability distribution is estimated, the Afficiency™ number, projected test score, and projected letter grade may be determined using a similar method as described above.

Because the computational cost for computing animated tests is linearly related to the number of skills in a test, using this random test method may be more efficient than the brute-force method (e.g., computing probabilities of all possible test outcomes) described above, which can obtain precise probability distribution but the computational cost is exponentially related to the number of skills in a test.

After the Afficiency™ number and/or the projected test score are determined, system 10/10' may display this information to the user. The user can continue practicing the Afficiency™ session until a target Afficiency™ number or a target projected test score is reached or no obvious progress can be made despite continued practice. In step 570, system 10/10' may prompt to the user whether more practice is desired, or system 10/10' may determine whether more practice is necessary based on the performance of the user. If no more practice is needed, system 10/10' may stop Afficiency™ session 500. If more practice is needed, system 10/10' may provide a new set of problem set for the user to practice. System 10/10' may select the problems in the new problem set intelligently, aiming to increase the Afficiency™ number.

In some embodiments, system 10/10' may select the new problem set based on a determination of one or more high impacting skills (step 580). A high impacting skill refers to a skill in which an improvement of the accuracy rate (or adjusted accuracy rate) associated with the high impacting skill results in a higher increase of the Afficiency™ number or projected test score than a same improvement of the accuracy rate (or adjusted accuracy rate) associated with a non-high impacting skill. For example, suppose skill p has an associated accuracy rate (or adjusted accuracy rate) A(p)=0.7 and a weighting factor W(p)=0.4, and skill q has an associated accuracy rate (or adjusted accuracy rate) A(q)=0.3 and a weighting factor W(q)=0.1, an improvement factor may be determined as IMP(i)=$(1-A(i))*W(i)$, indicating a weighed improvement potential. In the above example, IMP(p)=$(1-A(p))*W(p)=(1-0.7)*0.4=0.12$, while IMP(q)=$(1-A(q))*W(q)=(1-0.3)*0.1=0.07$. The improvement factors indicate that if the user improves skill p, for example, to increase the accuracy rate (or adjusted accuracy rate) from 0.7 to 1, the resulting impact on the increase of the Afficiency™ number or projected test score is measured as 0.12. On the other hand, even though the user has a larger improvement potential in skill q, to improve skill q by increasing the accuracy rate (or adjusted accuracy rate) from 0.3 to 1 only results in a smaller impact on the increase of the Afficiency™ number or projected test score. Therefore, system 10/10' may select problems in the new problem set by providing more problems associated with skill p and less or no problems associated with skill q. In this way, the user can improve skill(s) having higher impact on the outcome of the real test and avoid wasting time on those skill(s) having little impact, thereby improving the learning efficiency.

In some embodiments, the progress mark of a skill may be updated based on the results of Afficiency™ session 500. For example, for a skill, if (1) there are several (e.g., three) wrong answers in a row, or (2) the accuracy rate measured in answering up to a predetermined number (e.g., 10) of latest problems is less than a threshold (e.g., 0.5), then the progress mark of the skill may be demoted to a lower level, e.g., Level 3. The user may be disqualified from working on the Afficiency™ session of the grade level.

Figure 6:
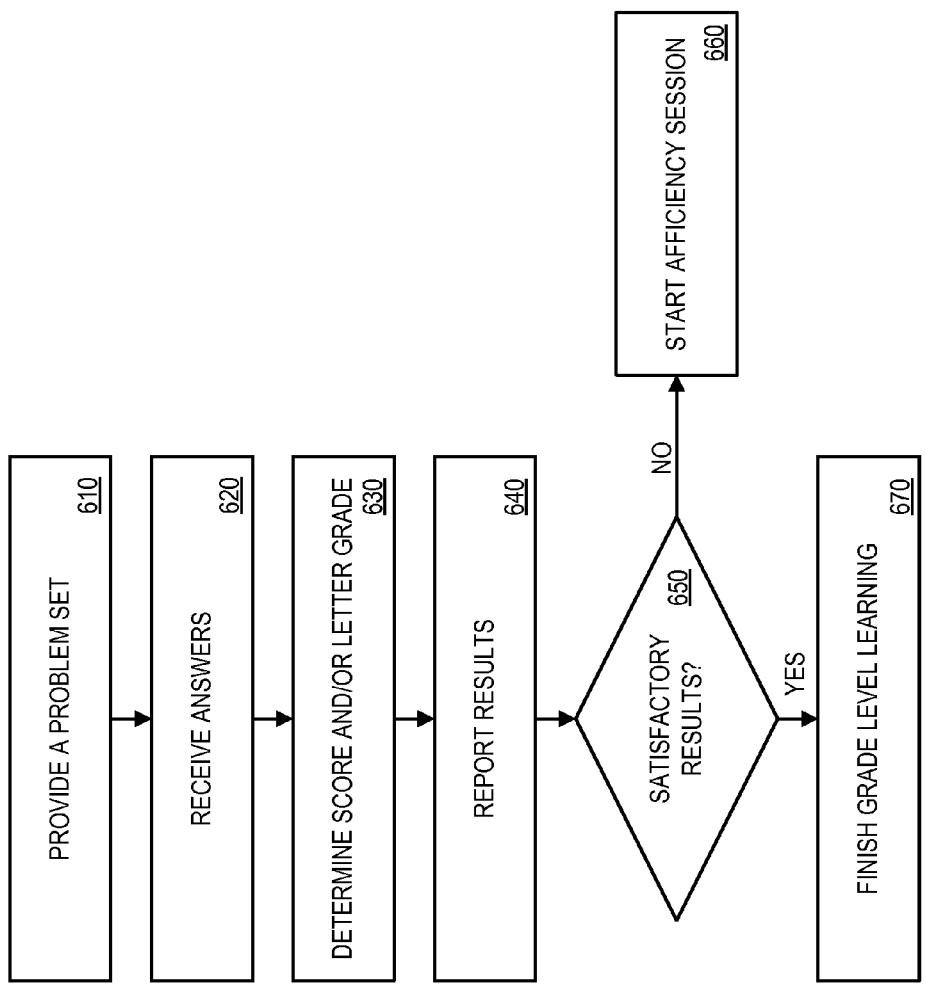
FIG. 6 is a flow chart of an exemplary method for implementing a test session, according to some embodiments of the present disclosure.

FIG. 6 is a flow chart of an exemplary method for implementing test session 600, according to some embodiments of the present disclosure. In test session 600 the user is provided with a grade level test. The grade level test may assemble a typical final exam in a school or a standardized test. The grade level test may be completed within a certain amount of time, but no credit may be given for completing the test shorter than the specified time. The user may receive a test score, such as a numerical score and/or a letter grade, after the test. The criteria of the grading may be consistent with those of high-quality public schools or standardized testing authorities. While the user is highly encouraged to start test session 600 after completing proficiency session 400 and Afficiency™ session 500 from which a high enough Afficiency™ number is achieved, the user can enter test session 600 and launch a grade level test at any stage.

In step 610, system 10/10' may provide a problem set of the grade level test to the user. In step 620, system 10/10' may receive answers from the user. In step 630, system 10/10' may determine a test score (e.g., a letter grade and/or a numerical score) based on the received answer. In step 640, system 10/10' may report testing results, including the test score, wrongly answered problems, etc. The user may be expected to make corrections of the wrongly answered problems until the correct answers are provided. In step 650, if the user is not satisfied with the result, the user can start or revisit Afficiency™ session 500 to make improvement (e.g., to improve Afficiency™ number) in step 660 and re-take the grade level test. In some embodiments, the testing result may be used to update the Afficiency™ number. If the user is satisfied with the result, system 10/10' may finish the grade level learning session (at step 670).

The disclosed learning or training applications have several advantages. First, the learning/training applications provide a self-paced learning environment for a user to learn new concepts and skills even without an instructor. Second, different learning/training sessions can efficiently improve the user's proficiency level. Third, with the information of the learning/training progress of the user, the applications intelligently focus on the skills that are most effective in improving the results. Fourth, the user can continuously improve the skill level, in an effective way, until the target result is reached.

The specification has described learning/training applications. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method, implemented by a processor device, for assessing a user's progress in learning a plurality of skills, the method comprising:
   assigning, by the processor device, a weighting factor to each of the plurality of skills;
   for each skill:
      providing, by the processor device, problems to the user;
      receiving, by the processor device, answers to the problems from the user;
      assigning, by the processor device, an index to each of the problems, wherein values of the indices assigned to the problems are determined based on whether a given problem of the problems was answered earlier than one or more other problems of the problems;
      determining, by the processor device, time durations spent by the user to answer the problems;
      determining, by the processor device, an accuracy rate associated with that skill based on the answers, the time durations, and the indices;
   determining, by the processor device, a probability of obtaining a score equal to or above a predetermined score by the user based on the weighting factors assigned to the plurality of skills and the accuracy rates associated with the plurality of skills;
   performing, by the processor device, animated tests, the animated tests randomly generating animated scores based on the weighting factors assigned to the plurality of skills and the accuracy rates associated with the plurality of skills; and
   determining, by the processor device, a probability distribution of obtaining a plurality of scores by the user based on the animated scores of the animated tests, wherein the probability distribution indicates a probability of obtaining a given range of scores based on numbers of the animated tests generating the given range of the animated scores over a total number of the animated tests.

2. The method of claim 1, further comprising:
   determining a projected test score based on the probability of obtaining the score equal to or above the predetermined score by the user.

3. The method of claim 1, further comprising:
determining a projected test score based on the weighting factors assigned to the plurality of skills and the accuracy rates associated with the plurality of skills.

4. The method of claim 1, further comprising:
determining a high impacting skill based on the weighting factors assigned to the plurality of skills and the accuracy rates associated with the plurality of skills, wherein an improvement of the accuracy rate associated with the high impacting skill results in a higher increase of the probability of obtaining the score equal to or above the predetermined score than an improvement of the accuracy rate associated with a non-high impacting skill.

5. The method of claim 4, further comprising:
providing additional problems associated with the high impacting skill to the user.

6. The method of claim 1, further comprising:
for each skill:
  determining a time modifier relating to the time durations spent by the user to answer one or more of the problems associated with that skill,
  wherein determining, by the processor device, the accuracy rate associated with that skill based on the answers, the time durations, and the indices comprising determining the accuracy rate based on the time modifier.

7. The method of claim 6, wherein determining the time modifier includes:
determining a ratio between actual time durations spent by the user to answer the one or more of the problems associated with a skill and a specified time associated with the skill; and
determining the time modifier based on the ratio.

8. A computer system for assessing a user's progress in learning a plurality of skills, the computer system comprising:
a processor device operatively coupled to a memory device, wherein the processor device is configured to execute instructions stored in the memory device to perform operations comprising:
  assigning a weighting factor to each of the plurality of skills;
  for each skill:
    providing problems to the user;
    receiving answers to the problems from the user;
    assigning an index to each of the problems, wherein values of the indices assigned to the problems are determined based on whether a given problem of the problems was answered earlier than one or more other problems of the problems;
    determining time durations spent by the user to answer the problems;
    determining an accuracy rate associated with that skill based on the answers, the time durations, and the indices;
  determining a probability of obtaining a score equal to or above a predetermined score by the user based on the weighting factors assigned to the plurality of skills and the accuracy rates associated with the plurality of skills;
  performing animated tests, the animated tests randomly generating animated scores based on the weighting factors assigned to the plurality of skills and the accuracy rates associated with the plurality of skills; and
  determining a probability distribution of obtaining a plurality of scores by the user based on the animated scores of the animated tests, wherein the probability distribution indicates a probability of obtaining a given range of scores based on numbers of the animated tests generating the given range of the animated scores over a total number of the animated tests.

9. The computer system of claim 8, wherein the processor device is further configured to execute the instructions stored in the memory device to perform operations comprising:
determining a projected test score based on the probability of obtaining the score equal to or above the predetermined score by the user.

10. The computer system of claim 8, wherein the processor device is further configured to execute the instructions stored in the memory device to perform operations comprising:
determining a projected test score based on the weighting factors assigned to the plurality of skills and the accuracy rates associated with the plurality of skills.

11. The computer system of claim 8, wherein the processor device is further configured to execute the instructions stored in the memory device to perform operations comprising:
determining a high impacting skill based on the weighting factors assigned to the plurality of skills and the accuracy rates associated with the plurality of skills, wherein an improvement of the accuracy rate associated with the high impacting skill results in a higher increase of the probability of obtaining the score equal to or above the predetermined score than an improvement of the accuracy rate associated with a non-high impacting skill.

12. The computer system of claim 11, wherein the processor device is further configured to execute the instructions stored in the memory device to perform operations comprising:
providing additional problems associated with the high impacting skill to the user.

13. The computer system of claim 8, wherein the processor device is further configured to execute the instructions stored in the memory device to perform operations comprising:
For each skill:
  determining a time modifier relating to the time durations spent by the user to answer one or more of the problems associated with that skill; and
  adjusting the accuracy rate based on the time modifier.

14. The computer system of claim 13, wherein the processor device is further configured to execute the instructions stored in the memory device to perform operations comprising:
determining a ratio between actual time durations spent by the user to answer the one or more of the problems associated with a skill and a specified time associated with the skill; and
determining the time modifier based on the ratio.

15. A non-transitory, computer-readable medium storing instructions that, when executed by a processor device, cause the processor device to perform a method for assessing a user's progress in learning a plurality of skills, the method comprising:

assigning a weighting factor to each of the plurality of skills;

for each skill:
  providing problems to the user;
  receiving answers to the problems from the user;
  assigning an index to each of the problems, wherein values of the indices assigned to the problems are determined based on whether a given problem of the problems was answered earlier than one or more other problems of the problems;
  determining time durations spent by the user to answer the problems;
  determining an accuracy rate associated with that skill based on the answers, the time durations, and the indices;

determining a probability of obtaining a score equal to or above a predetermined score by the user based on the weighting factors assigned to the plurality of skills and the accuracy rates associated with the plurality of skills;

performing animated tests, the animated tests randomly generating animated scores based on the weighting factors assigned to the plurality of skills and the accuracy rates associated with the plurality of skills; and determining a probability distribution of obtaining a plurality of scores by the user based on the animated scores of the animated tests, wherein the probability distribution indicates a probability of obtaining a given range of scores based on numbers of the animated tests generating the given range of the animated scores over a total number of the animated tests.

16. The computer-readable medium of claim 15, wherein the method further comprises:
  determining a projected test score based on the probability of obtaining the score equal to or above the predetermined score by the user.

17. The computer-readable medium of claim 15, wherein the method further comprises
  determining a projected test score based on the weighting factors assigned to the plurality of skills and the accuracy rates associated with the plurality of skills.

18. The computer-readable medium of claim 15, wherein the method further comprises
  determining a high impacting skill based on the weighting factors assigned to the plurality of skills and the accuracy rates associated with the plurality of skills, wherein an improvement of the accuracy rate associated with the high impacting skill results in a higher increase of the probability of obtaining the score equal to or above the predetermined score than an improvement of the accuracy rate associated with a non-high impacting skill.

19. The computer-readable medium of claim 18, wherein the method further comprises:
  providing additional problems associated with the high impacting skill to the user.

20. The computer-readable medium of claim 15, wherein the method further comprises:
  For each skill:
    determining a time modifier relating to the time durations spent by the user to answer one or more of the problems associated with that skill; and
    adjusting the accuracy rate based on the time modifier.

21. The computer-readable medium of claim 20, wherein the method further comprises
  determining a ratio between actual time durations spent by the user to answer the one or more of the problems associated with a skill and a specified time associated with the skill; and
  determining the time modifier based on the ratio.

* * * * *